United States Patent
Kamura et al.

(10) Patent No.: US 9,588,297 B2
(45) Date of Patent: Mar. 7, 2017

(54) WAVELENGTH SELECTIVE SWITCH, VARIABLE DISPERSION COMPENSATOR, OPTICAL TRANSMISSION APPARATUS, AND OPTICAL TRANSMISSION SYSTEM

(71) Applicant: FUJITSU LIMITED, Kawasaki-shi, Kanagawa (JP)

(72) Inventors: Yuji Kamura, Ota (JP); Ichiro Nakajima, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 14/459,001

(22) Filed: Aug. 13, 2014

(65) Prior Publication Data
US 2014/0348464 A1 Nov. 27, 2014

Related U.S. Application Data

(63) Continuation of application No. PCT/JP2012/056986, filed on Mar. 19, 2012.

(51) Int. Cl.
*G02B 6/35* (2006.01)
*H04J 14/02* (2006.01)
(Continued)

(52) U.S. Cl.
CPC ....... *G02B 6/29385* (2013.01); *G02B 6/3588* (2013.01); *H04B 10/0775* (2013.01);
(Continued)

(58) Field of Classification Search
None
See application file for complete search history.

(56) References Cited

U.S. PATENT DOCUMENTS

2005/0180748 A1   8/2005 Kawahata
2006/0215955 A1*  9/2006 Mitamura ............ G02B 6/2931
                                              385/18
(Continued)

FOREIGN PATENT DOCUMENTS

EP   1701580 A2   9/2006
EP   1821437 A1   8/2007
(Continued)

OTHER PUBLICATIONS

EESR—The Extended European Search Report mailed on Oct. 12, 2015 for corresponding European Patent Application No. 12871896.2.  US2006/215955A1 cited in the above listed EESR was previously submitted in the IDS filed on Aug. 13, 2014. 
(Continued)

*Primary Examiner* — Michelle R Connelly
(74) *Attorney, Agent, or Firm* — Fujitsu Patent Center

(57) ABSTRACT

A wavelength selective switch is configured to demultiplex WDM light input from an input side for each wavelength, to supply the demultiplexed signal lights to deflectors corresponding to the demultiplexed wavelength, and to control the deflector to selectively output the demultiplexed signal lights to an output side, in which monitor light having at least a wavelength included in the WDM light is input to the wavelength selective switch from the output side of the wavelength selective switch, and the monitor light input from the output side of the wavelength selective switch is monitored, the monitor light being propagated in a direction opposite to a propagation direction of the signal lights each having the demultiplexed wavelength in the wavelength selective switch and being output to the input side of the wavelength selective switch.

5 Claims, 21 Drawing Sheets

(51) Int. Cl.
*H04B 3/46* (2015.01)
*G02B 6/293* (2006.01)
*H04B 10/077* (2013.01)
*H04B 10/2513* (2013.01)

(52) U.S. Cl.
CPC .... *H04B 10/25133* (2013.01); *H04J 14/0204* (2013.01); *H04J 14/0209* (2013.01); *H04J 14/0212* (2013.01); *H04J 14/0217* (2013.01); *H04J 14/0227* (2013.01); *H04J 14/0283* (2013.01)

(56) References Cited

U.S. PATENT DOCUMENTS

| | | |
|---|---|---|
| 2007/0196107 A1 | 8/2007 | Takita |
| 2009/0304328 A1 | 12/2009 | Presley et al. |
| 2010/0260499 A1 | 10/2010 | Izumi |

FOREIGN PATENT DOCUMENTS

| | | | |
|---|---|---|---|
| JP | 2006-86955 | 3/2006 | |
| JP | EP 1701580 A2 * | 9/2006 | ......... H04Q 11/0005 |
| JP | 2006-267522 | 10/2006 | |
| JP | 2006-340208 | 12/2006 | |
| JP | 2007-221499 | 8/2007 | |
| JP | 2010-245993 | 10/2010 | |

OTHER PUBLICATIONS

JPOA—Japanese Office Action mailed on Jul. 14, 2015 for corresponding Japanese Patent Application No. 2014-505827, with partial English translation of the relevant part. All references cited in the JPOA were previously submitted in the IDS filed on Aug. 13, 2014.

International Search Report, mailed in connection with PCT/JP2012/056986 and mailed May 15, 2012.

* cited by examiner

FIG. 8

| INPUT PORT | CHANNEL(ch) | SETTING |
|---|---|---|
| #1 | #1 | ON (TRANSMISSION) |
| #1 | #4 | OFF (BLOCKING) |
| #2 | #2 | OFF (BLOCKING) |
| #3 | #3 | ON (TRANSMISSION) |
| #3 | #5 | ON (TRANSMISSION) |

FIG. 11

| INPUT PORT | CHANNEL(ch) | SETTING |
|---|---|---|
| #1 | #1 | ON (TRANSMISSION) |
| #1 | #4 | OFF (BLOCKING) |
| #2 | #2 | OFF (BLOCKING) |
| #3 | #3 | ON (TRANSMISSION) |
| #3 | #5 | ON (TRANSMISSION) |
| #2 | #6 | ON (TRANSMISSION) |

WAVELENGTH SELECTIVE SWITCH, VARIABLE DISPERSION COMPENSATOR, OPTICAL TRANSMISSION APPARATUS, AND OPTICAL TRANSMISSION SYSTEM

CROSS-REFERENCE TO RELATED APPLICATION

This application is a continuation application of International Application PCT/JP2012/056986, filed on Mar. 19, 2012 and designated the U.S., the entire contents of which are incorporated herein by reference.

FIELD

The embodiment(s) discussed herein is related to a wavelength selective switch, a variable dispersion compensator, a monitor apparatus, a monitor method, an optical transmission apparatus, and an optical transmission system.

BACKGROUND

In recent years, an optical transmission network configuration using a wavelength division multiplexing (WDM) technique has been advanced in accordance with the increase in communication traffic.

The optical transmission network using the WDM technique utilizes, for example, an optical add-drop multiplexer (OADM) capable of passing (through), inserting (adding), and splitting (dropping) signal light for each wavelength, in addition to a terminal apparatus or a relay node.

FIG. 1 illustrates an example of a configuration of an optical transmission network 100.

The optical transmission network 100 illustrated in FIG. 1 includes, for example, an optical transmission station (Tx) 200, a plurality of OADMs 400-1 to 400-5, and an optical reception station (Rx) 300. The OADMs 400-1 to 400-5 are simply referred to as an OADM 400 below when they are not discriminated.

In an example illustrated in FIG. 1, signal light transmitted from the Tx 200 is inserted to wavelength-division multiplexed light transmitted to an optical transmission path by the OADM 400-1 (OADM #1) and then passes through the OADM 400-2 (OADM #2) and the OADM 400-3 (OADM #3). Further, the passed light is split at the OADM 400-4 (OADM #4) and is received by the Rx 300.

The OADM 400 includes, for example, an arrayed waveguide grating (AWG), a multilayer film filter, a fiber bragg grating (FBG), a wavelength selective switch (WSS) or the like to pass, insert, and split the signal light for each wavelength.

FIG. 2 illustrates an example of a configuration of the OADM 400.

The OADM 400 illustrated in FIG. 2 includes, for example, an optical amplifier 401, an optical coupler 402, an optical coupler 403, a WSS 404, an optical coupler 405, an optical amplifier 406, and an optical channel monitor (OCM) 407. In addition, the OADM 400 includes, for example, a demultiplexer 408, an optical receiver (Rx) 409, a multiplexer 410, and an optical transmitter (Tx) 411.

The wavelength-division multiplexed light input to the OADM 400 from the optical transmission path is amplified by the optical amplifier 401 and then is split in power by the optical coupler 402.

One of the wavelength-division multiplexed light split by the optical coupler 402 is demultiplexed by the demultiplexer 408 for each wavelength and is received by the Rx 409.

The other of the wavelength-division multiplexed light split by the optical coupler 402 is input to a route toward the WSS 404. In addition, each signal light transmitted from the Tx 411 or the like is multiplexed by the multiplexer 410 and is also input to the WSS 404.

The WSS 404 selects either one of the signal light included in the wavelength-division multiplexed light transmitted through the optical transmission path and the signal light inserted from the multiplexer 410 for each wavelength. For example, when the OADM 400 performs passing through on a signal light with a certain wavelength, the WSS 404 selects the signal light with the corresponding wavelength included in the wavelength-division multiplexed light transmitted through the optical transmission path. Meanwhile, when the OADM 400 performs adding on a signal light with a certain wavelength, the WSS 404 selects the signal light inserted from the multiplexer 410.

The signal light selected by the WSS 404 is output to the optical amplifier 406 and is amplified by the optical amplifier 406 to be output to the optical transmission path.

The wavelength-division multiplexed light input to the WSS 404 is split in power by the optical coupler 403 to be input to the OCM 407, and, similarly, the wavelength-division multiplexed light output from the WSS 404 is split in power by the optical coupler 405 to be input to the OCM 407.

The OCM 407 monitors, for example, a power level of an input signal of the WSS 404 and a power level of an output signal of the WSS 404 for each channel (wavelength) and controls the amount of attenuation in the WSS 404 based on the monitor result such that the signal light becomes a target power level for each wavelength. The OCM 407 may control the amount of amplification in the optical amplifiers 401 and 406 based on the monitor result.

Meanwhile, as a monitor control method of the wavelength selective switch, for example, JP 2010-245993 A discloses a method of detecting a channel in which the deterioration in the power level exists by monitoring input light and output light.

As an example of a configuration of a wavelength selective switch (WSS), a WSS using a mirror array is known as illustrated in FIG. 3. The WSS has good characteristics for a transmission band, a loss, or a polarization dependency of signal light.

The WSS 404 illustrated in FIG. 3 includes, for example, an output port 430, a plurality of input ports 431-1 to 431-3, a collimator 432, a dispersion element 433, a lens 434, and mirror array 435. However, a configuration of the WSS 404 with three-input and one-output illustrated in FIG. 3 is illustrative and the number of ports is not limited thereto.

For example, an optical fiber or the like is used for the input ports 431-1 to 431-3. Each wavelength-division multiplexed light input from the input ports 431-1 to 431-3 is converted into a parallel light beam by the collimator 432 to be emitted to a space and is incident on the dispersion element 433. Each wavelength-division multiplexed light incident on the dispersion element 433, is demultiplexed (dispersed) into light each having the wavelength by the dispersion element 433. In the example illustrated in FIG. 3, an arrangement direction Y of each port is vertical to a dispersion direction X by the dispersion element 433.

Here, diffraction grating is generally used for the dispersion element 433. The diffraction grating is an optical element in which a number of parallel grooves are periodically carved on a glass substrate. By using a diffraction phenomenon, the diffraction grating is possible to emit light beams having plural wavelengths, which are incident at a constant angle, in different angles for each wavelength to thereby separate the light beams for each wavelength.

Since the light beams dispersed into each wavelength by the dispersion element 433 diffuses as they are, the light beams are converted into parallel light beams again by the lens 434.

Generally, an arrayed mirror having mirrors so called MEMS mirrors formed with a micro electro mechanical systems (MEMS) technique is used for the mirror array 435. For example, one MEMS mirror is arranged in the mirror array 435 in correspondence with light having one wavelength separated by the dispersion element 433.

The MEMS mirror has a configuration in which an inclination angle of a reflection surface is variable by an electromagnetic force and an output port to which reflected light is guided is determined in correspondence with the inclination angle of the reflection surface. The WSS 404 illustrated in FIG. 3 may control the amount of its attenuation by changing the angle of the MEMS mirror to thereby change optical coupling efficiency between the signal light and the output port.

FIG. 4 is a diagram of the WSS 404 illustrated in FIG. 3 when viewed in the X direction, and FIG. 5 is a diagram of the WSS 404 illustrated in FIG. 3 when viewed in the Y direction.

Incidentally, one of parameters indicating performance of the above-described wavelength selective switch is, for example, a transmission band characteristic.

As a ratio (W/ω) of a width W of the mirror to a beam diameter ω of the light collected onto the MEMS mirror corresponding to each wavelength is greater and a deviation of a center wavelength is smaller, a transmission band of the wavelength selective switch becomes wider. In other words, as the width W of the MEMS mirror is large, the beam diameter ω on the MEMS mirror is small, and a collecting position of the light corresponding to each wavelength of an International Telecommunication Union (ITU) grid coincides with the center of the MEMS mirror, the transmission band becomes wider. The ITU grid is a wavelength standardized by the International Telecommunication Union (ITU).

As the transmission band of the wavelength selective switch becomes wider, there are advantages that an upper limit of an available bit rate rises or that the number of multi-stage connections of the wavelength selective switches can increase. In other words, as the transmission band of the wavelength selective switch becomes narrower, it is difficult to ensure a good transmission characteristic.

Here, the MEMS mirror cannot be controlled at a target angle in some cases due to deterioration or arrangement deviation of the mirror array 435 inside the WSS 404 or an optical element such as the dispersion element 433, deviation of an refractive index due to change in composition of a filling gas, deterioration of a driving circuit, failure thereof or the like.

In such case, the signal light input to the WSS 404 may be unavailable to be output normally. For example, the signal light is not output from the WSS 404, or the transmission band of the WSS 404 is deteriorated.

Specifically, under the circumstances where a signal rate per one wavelength becomes a high speed such as 10 G, 40 G, 100 G, . . . , a signal light spectrum tends to be thicker in a wavelength direction, and thus the deterioration in the transmission band of the WSS 404 more easily causes degradation in signal quality.

Therefore, in some cases, an operation state of the wavelength selective switch is monitored based on a power level of main signal light input to the wavelength selective switch and a power level of the main signal light output from the wavelength selective switch.

However, a method of monitoring the input/output power levels of the main signal light is unavailable to monitor the deterioration in the transmission band of the wavelength selective switch. Further, since the main signal light is constantly needed at the time of the monitor control of the wavelength selective switch, the monitor control of the wavelength selective switch is unavailable before the optical transmission network is in service.

Meanwhile, although a monitor light may be input to the wavelength selective switch together with the main signal light, the interference with the main signal light may occur.

Further, even in the variable dispersion compensator capable of performing variable dispersion compensation processing on the input light, there is a problem similar to the above.

SUMMARY (1) As a first aspect, for example, it is possible to use a wavelength selective switch configured to demultiplex wavelength-division multiplexed light input from an input side for each wavelength, to supply the demultiplexed signal lights each having demultiplexed wavelength to deflectors corresponding to the demultiplexed wavelength, and to control the amount of deflection of each of the deflectors to selectively output the demultiplexed signal lights each having the demultiplexed wavelength to an output side, the wavelength selective switch including: a light source configured to generate monitor light having at least a wavelength included in the wavelength-division multiplexed light; a monitor light input unit configured to input the monitor light generated by the light source to the wavelength selective switch from the output side of the wavelength selective switch; a monitor light extraction unit configured to extract the monitor light input from the output side of the wavelength selective switch by the monitor light input unit, the monitor light being propagated in a direction opposite to a propagation direction of the signal lights each having the demultiplexed wavelength in the wavelength selective switch and being output to the input side of the wavelength selective switch; and a monitor configured to monitor the monitor light extracted by the monitor light extraction unit.

(2) As a second aspect, further, it is possible to use a variable dispersion compensator including: an optical system configured to collect input light input from an input side in a one-dimensional direction; an optical component having two parallel planes opposite to each other, one of the parallel planes being formed with an irradiation window and a first reflection surface, the other of the parallel planes being formed with a second reflection surface, the light collected in the one-dimensional direction by the optical system entering between the first reflection surface and the second reflection surface through the irradiation window, the entered light being multi-reflected on each of the reflection surfaces and a part of the reflected light being transmitted and emitted through the second reflection surface, the parallel planes serving as a wavelength demultiplexer configured to form light fluxes traveling in different directions depending on wavelengths by using interference of the emitted light from the second reflection surface; a reflector configured to reflect the light fluxes each having the demultiplexed wavelength, the light fluxes being emitted to different directions from the second reflection surface of the optical component, such that the light fluxes return to the optical component and are output from the output side; a light source configured to generate monitor light having at least a wavelength included in the input light; a monitor light input unit configured to input the monitor light generated by the light source to the variable dispersion compensator from the output side of the variable dispersion compensator; a monitor light extraction unit configured to extract the monitor light input from the output side of the variable dispersion compensator by the monitor light input unit, the monitor light being propagated in a direction opposite to a propagation direction of the input light each having the demultiplexed wavelength in the variable dispersion compensator and being output to the input side of the variable dispersion compensator; and a monitor configured to monitor the monitor light extracted by the monitor light extraction unit.

(3) As a third aspect, further, it is possible to use a monitor apparatus of a wavelength selective switch configured to demultiplex wavelength-division multiplexed light input from an input side for each wavelength, to supply the demultiplexed signal lights each having the demultiplexed wavelength to deflectors corresponding to the demultiplexed wavelength, and to control the amount of deflection of each of the deflectors to selectively output the demultiplexed signal lights each having the demultiplexed wavelength to an output side, the monitor apparatus including: a light source configured to generate monitor light having at least a wavelength included in the wavelength-division multiplexed light; a monitor light input unit configured to input the monitor light generated by the light source to the wavelength selective switch from the output side of the wavelength selective switch; a monitor light extraction unit configured to extract the monitor light input from the output side of the wavelength selective switch by the monitor light input unit, the monitor light being propagated in a direction opposite to a propagation direction of the signal lights each having the demultiplexed wavelength in the wavelength selective switch and being output to the input side of the wavelength selective switch; and a monitor configured to monitor the monitor light extracted by the monitor light extraction unit.

(4) As a fourth aspect, further, it is possible to use a monitor apparatus of a variable dispersion compensator including: an optical system configured to collect input light input from an input side in a one-dimensional direction; an optical component having two parallel planes opposite to each other, one of the parallel planes being formed with an irradiation window and a first reflection surface, the other of the parallel planes being formed with a second reflection surface, the light collected in the one-dimensional direction by the optical system entering between the first reflection surface and the second reflection surface through the irradiation window, the entered light being multi-reflected on each of the reflection surfaces and a part of the reflected light being transmitted and emitted through the second reflection surface, the parallel planes serving as a wavelength demultiplexer configured to form light fluxes traveling in different directions depending on wavelengths by using interference of the emitted light from the second reflection surface; and a reflector configured to reflect the light fluxes each having the demultiplexed wavelength, the light fluxes being emitted to different directions from the second reflection surface of the optical component, such that the light fluxes return to the optical component and are output from the output side, the monitor apparatus including: a light source configured to generate monitor light having at least a wavelength included in the input light; a monitor light input unit configured to input the monitor light generated by the light source to the variable dispersion compensator from the output side of the variable dispersion compensator; a monitor light extraction unit configured to extract the monitor light input from the output side of the variable dispersion compensator by the monitor light input unit, the monitor light being propagated in a direction opposite to a propagation direction of the input lights each having the demultiplexed wavelength in the variable dispersion compensator and being output to the input side of the variable dispersion compensator; and a monitor configured to monitor the monitor light extracted by the monitor light extraction unit.

(5) As a fifth aspect, further, it is possible to use a monitor method of a wavelength selective switch configured to demultiplex wavelength-division multiplexed light input from an input side for each wavelength, to supply the demultiplexed signal lights each having demultiplexed wavelength to deflectors corresponding to the demultiplexed wavelength, and to control the amount of deflection of each of the deflector to selectively output the demultiplexed signal lights each having the demultiplexed wavelength to an output side, the monitor method including: inputting monitor light having at least a wavelength included in the wavelength-division multiplexed light to the wavelength selective switch from the output side of the wavelength selective switch; and monitoring the monitor light input from the output side of the wavelength selective switch, the monitor light being propagated in a direction opposite to a propagation direction of the signal lights each having the demultiplexed wavelength in the wavelength selective switch and being output to the input side of the wavelength selective switch.

(6) As a sixth aspect, further, it is possible to use a monitor method of a variable dispersion compensator including: an optical system configured to collect input light input from an input side in a one-dimensional direction; an optical component having two parallel planes opposite to each other, one of the parallel planes being formed with an irradiation window and a first reflection surface, the other of the parallel planes being formed with a second reflection surface, the light collected in the one-dimensional direction by the optical system entering between the first reflection surface and the second reflection surface through the irradiation window, the entered light being multi-reflected on each of the reflection surfaces and a part of the reflected light being transmitted and emitted through the second reflection surface, the parallel planes serving as a wavelength demultiplexer configured to form light fluxes traveling in different directions depending on wavelengths by using interference of the emitted light from the second reflection surface; and a reflector configured to reflect the light fluxes each having the demultiplexed wavelength, the light fluxes being emitted to different directions from the second reflection surface of the optical component, such that the light fluxes return to the optical component and are output from the output side, the monitor method including: inputting monitor light having at least a wavelength included in the input light to the variable dispersion compensator from the output side of the variable dispersion compensator; and monitoring the monitor light input from the output side of the variable dispersion compensator, the monitor light being propagated in a direction opposite to a propagation direction of the input lights in the variable dispersion compensator and being output to the input side of the variable dispersion compensator.

(7) As a seventh aspect, further, it is possible to use an optical transmission apparatus including the wavelength selective switch according to the first aspect.

(8) As an eighth aspect, further, it is possible to use an optical transmission apparatus including the variable dispersion compensator according to the second aspect.

(9) As a ninth aspect, further, it is possible to use an optical transmission system including the optical transmission apparatus according to the seventh or eighth aspect.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 8 is a diagram illustrating an example of input and output setting in the wavelength selective switch.

FIG. 11 is a diagram illustrating an example of input and output setting in the wavelength selective switch.

DESCRIPTION OF EMBODIMENT(S)

Hereinafter, an embodiment will be described with reference to the drawings. The embodiment to be described below is merely an example and there is no intention to exclude various modifications and applications of techniques that are not described explicitly in the following embodiment and modified examples. In other words, the embodiment can be modified in various ways and implemented within the scope of the invention without departing from the spirit thereof by combining the embodiment and the modifications.

(1) With respect to monitor control method of wavelength selective switch

An example of a monitor control method of a wavelength selective switch will be described.

Figure 1:
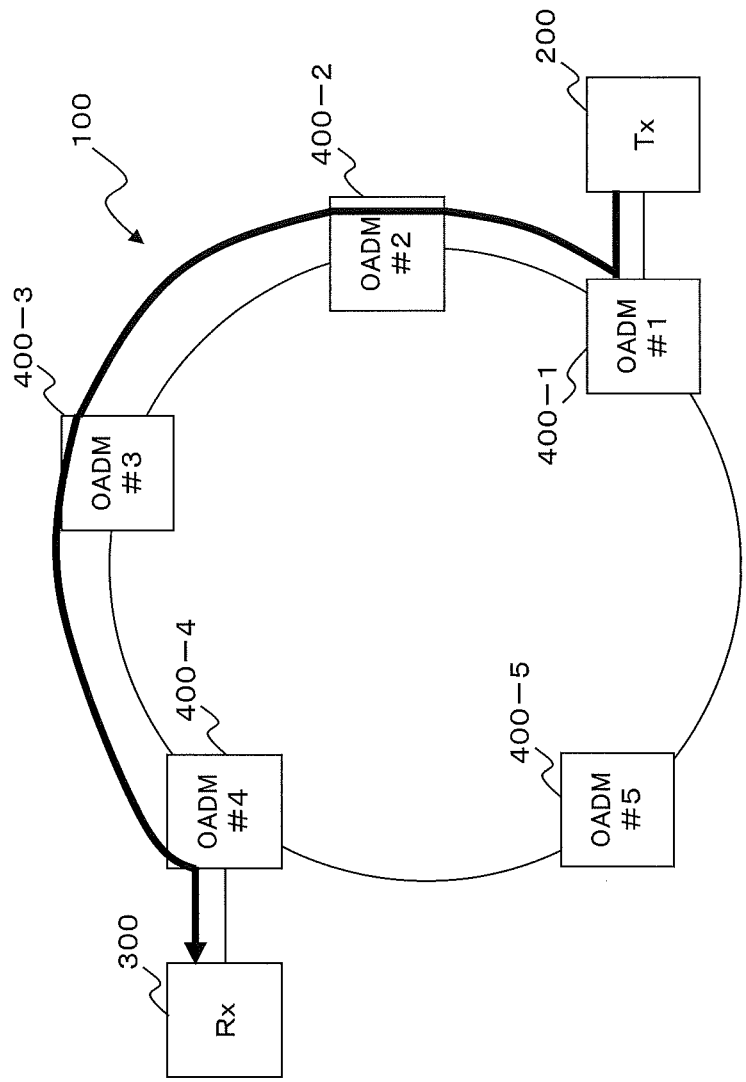
FIG. 1 is a diagram illustrating an example of a configuration of an optical transmission network.
Figure 2:
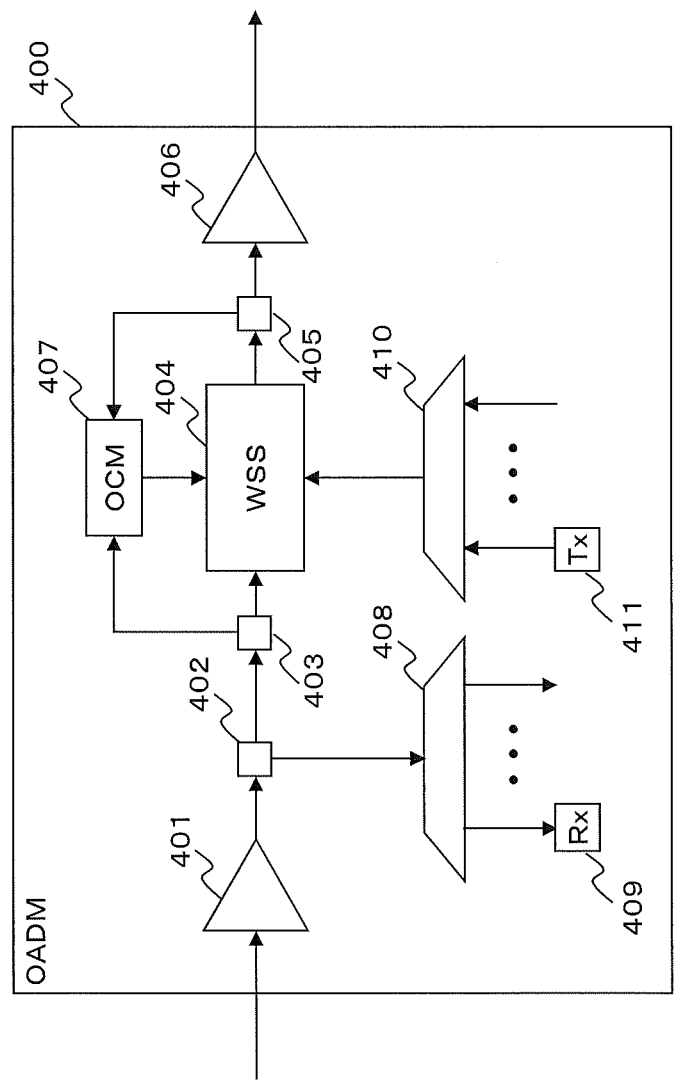
FIG. 2 is a diagram illustrating an example of a configuration of an OADM.
Figure 3:
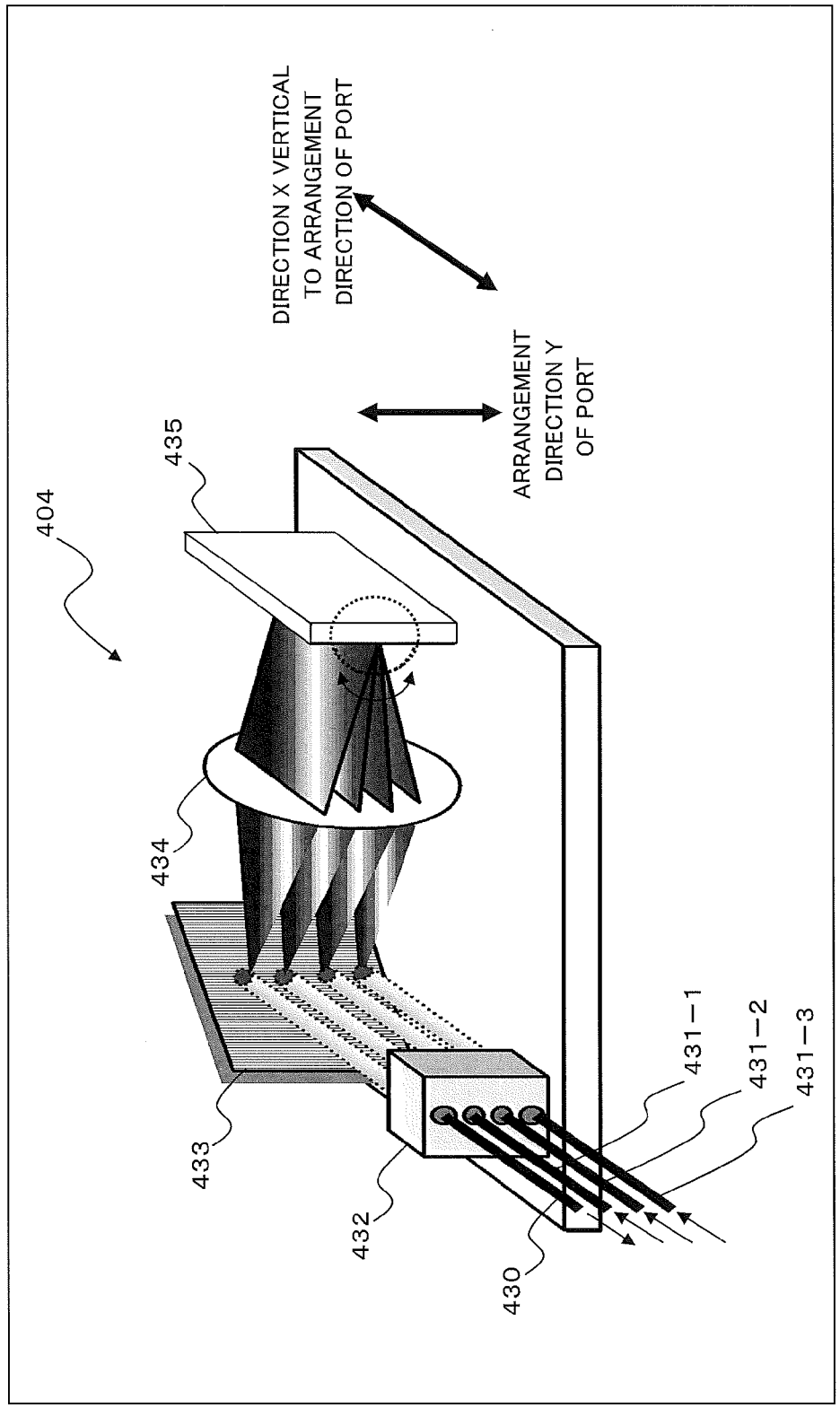
FIG. 3 is a diagram illustrating an example of a configuration of a wavelength selective switch.
Figure 4:
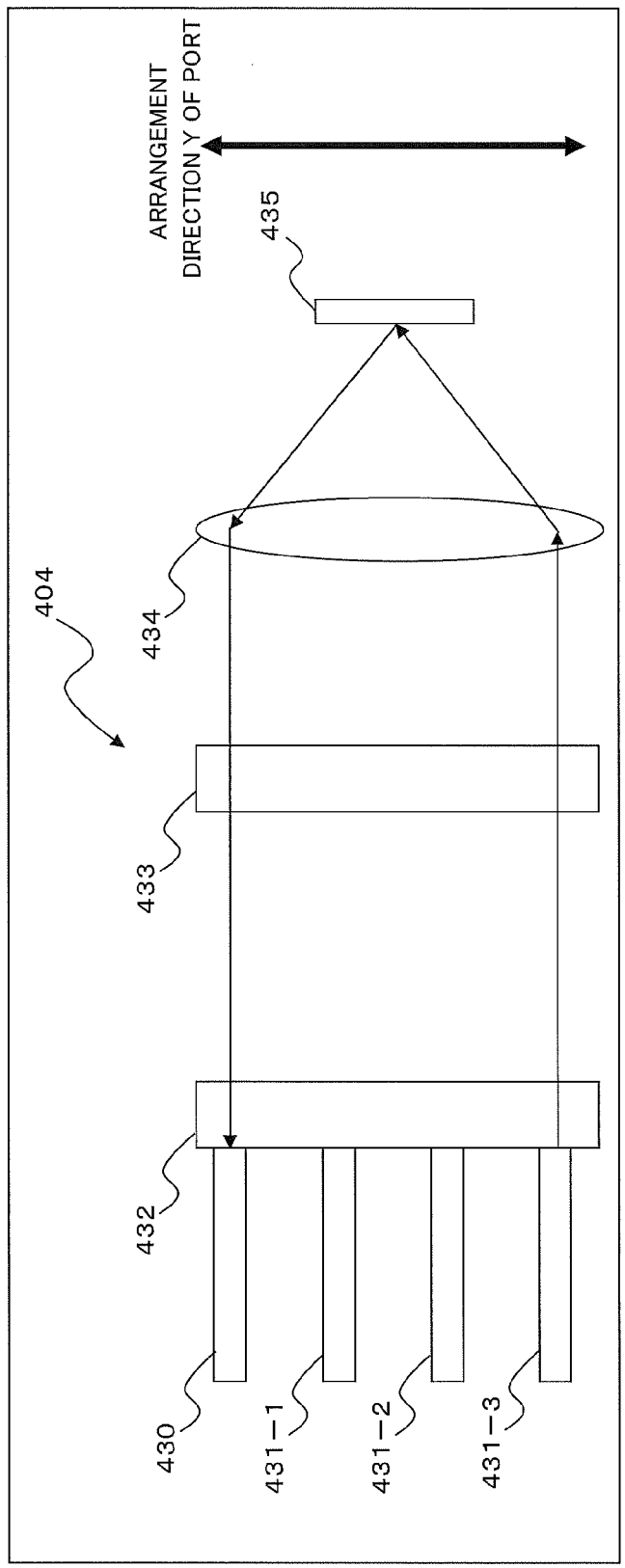
FIG. 4 is a diagram of the wavelength selective switch illustrated in FIG. 3 when viewed in an X direction.
Figure 5:
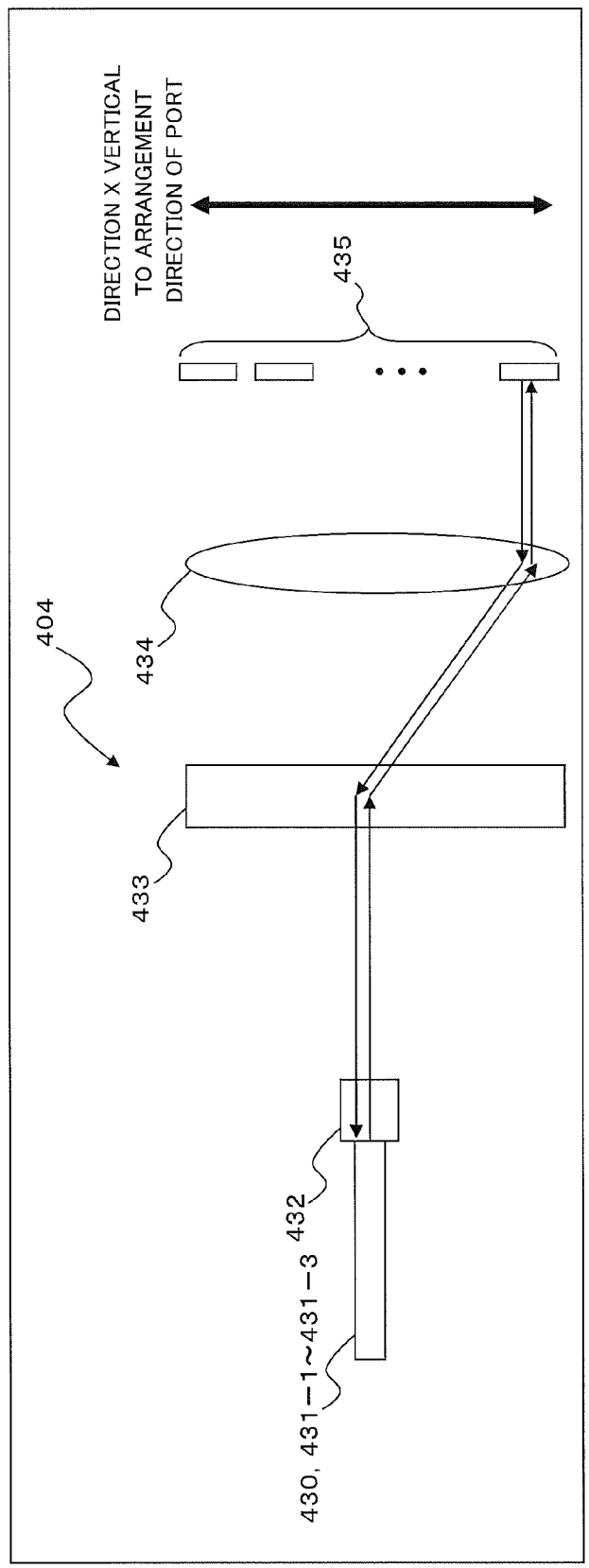
FIG. 5 is a diagram of the wavelength selective switch illustrated in FIG. 3 when viewed in a Y direction.
Figure 6:
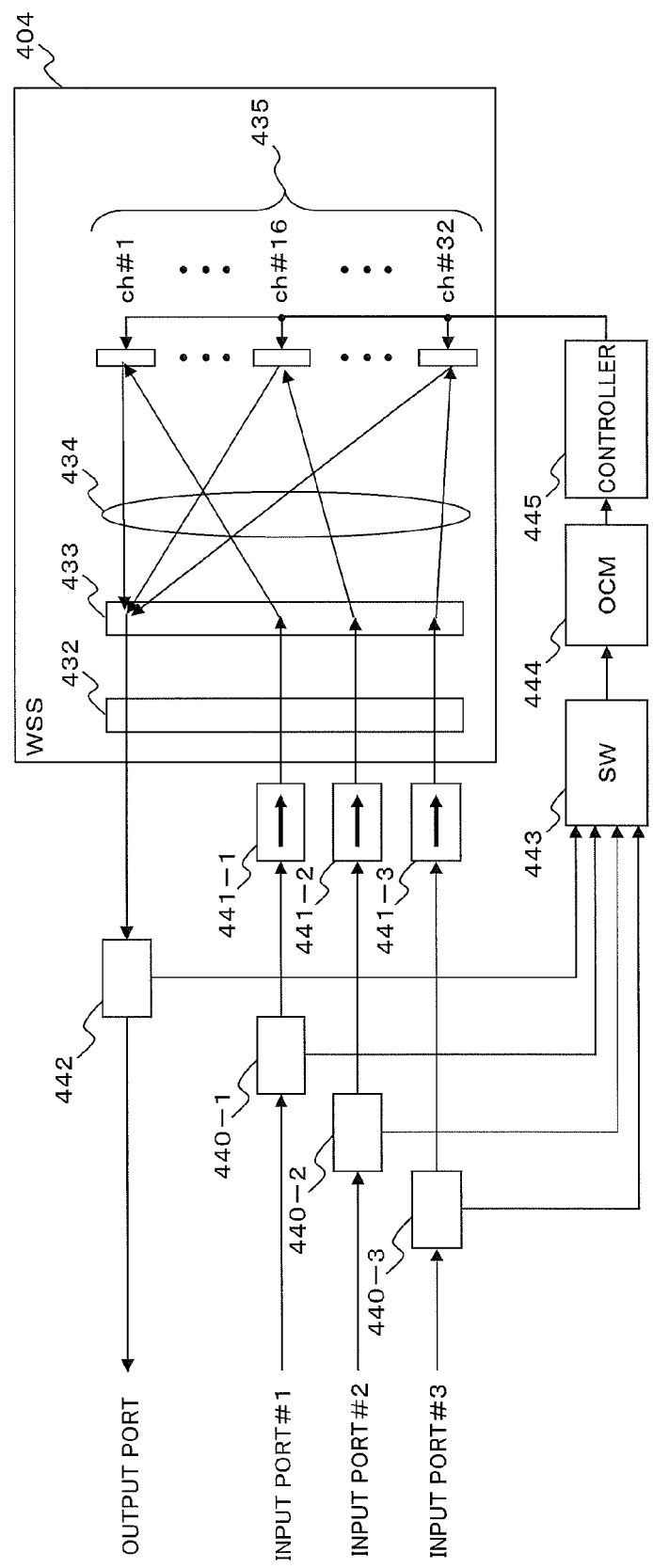
FIG. 6 is a diagram illustrating an example of a configuration of a monitor control in the wavelength selective switch.

For example, a configuration of a monitor control in the wavelength selective switch illustrated in FIG. 6 includes optical couplers 440-1 to 440-3, optical isolators 441-1 to 441-3, a wavelength selective switch (WSS) 404, an optical coupler 442, an optical switch (SW) 443, an optical channel monitor (OCM) 444, and a controller 445. In the example illustrated FIG. 6, the WSS 404 with three-input and one-output is used but the number of ports is not limited thereto. Further, in the example illustrated FIG. 6, wavelength-division multiplexed light input to each input port includes signal light of ch#1 to ch#32 but the number of multiplexed wavelengths (the number of channels) is also not limited thereto.

The wavelength-division multiplexed light input to the WSS 404 from each of input ports #1 to #3, is converted into parallel light beams by a collimator 432 to be emitted to a space, and the emitted light beams are incident on a dispersion element 433 which is configured by using, for example, diffraction grating. The dispersion element 433 demultiplexes (disperses) the incident light beams into each wavelength. For convenience, an arrangement direction Y of each port and a dispersion direction X by the dispersion element 433 are illustrated as the same direction in FIG. 6.

Here, for example, upon focusing on the signal light of ch#16 included in each wavelength-division multiplexed light, the signal light of ch#16 dispersed by the dispersion element 433 is converted again into the parallel light beam by a lens 434 to be incident on one MEMS mirror in a mirror array 435.

For example, the angle of each MEMS mirror is controlled by the controller 445, and each of the signal light beams with the respective wavelengths included in each wavelength-division multiplexed light input to the input ports #1 to #3 is reflected by the one MEMS mirror controlled its angle. Thereby, each of the signal light beams is selectively emitted to a route of the output port through the lens 434, the dispersion element 433, and the collimator 432.

The optical isolators 441-1 to 441-3 prevent the reflected light from the output port from being incident on each of the input port sides.

The monitor control of the WSS 404 is performed, for example, by comparing a power level of the signal light input to the WSS 404 with a power level of the signal light output from the WSS 404.

For this, each wavelength-division multiplexed light input to the input ports #1 to #3 is split in power to a route of the SW 443 by the optical couplers 440-1 to 440-3. Further, the wavelength-division multiplexed light to be output to an output port is split in power to the route of the SW 443 by the optical coupler 442.

The SW 443 selects any one of the signal light, which are split in power by each of the optical couplers 440-1 to 440-3 and 442, and outputs the selected signal light to an OCM 444.

The OCM 444 monitors the power level of each input signal of the WSS 404 and the power level of the output signal of the WSS 404 for each channel (wavelength) and controls the amount of attenuation of the WSS 404 based on the monitor result such that the signal light with each wavelength has a target power level. The amount of attenuation can be controlled by a change in optical coupling efficiency between the signal light and the output port by varying the angle of the MEMS mirror.

The OCM 444 is possible to monitor an operation state of the WSS 404 based on the input signal of the WSS 404, the output signal of the WSS 404, and information on input and output setting of the WSS 404.

Figure 7:
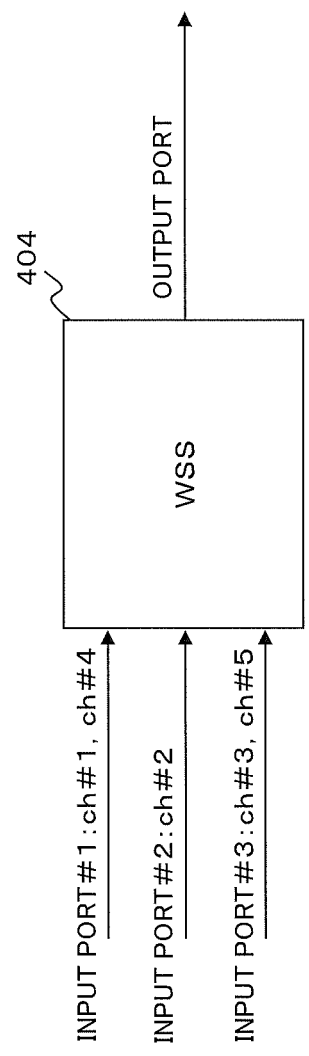
FIG. 7 is a diagram illustrating an example of input and output in the wavelength selective switch.

FIG. 7 is a diagram illustrating an example of input and output in the WSS 404.

In the example illustrated in FIG. 7, wavelength-division multiplexed light obtained by wavelength-division multiplexing of each signal light of ch#1 and ch#4 is input from the input port #1, the signal light of ch#2 is input from the input port #2, and wavelength-division multiplexed light obtained by the wavelength-division multiplexing of each signal light of ch#3 and ch#5 is input from the input port #3.

Then, when the WSS 404 is provided with input and output setting as illustrated in FIG. 8, the wavelength-division multiplexed light obtained by the wavelength-division multiplexing of each signal light of ch#1, ch#3, and ch#5 is to be output from the WSS 404.

Figure 9:
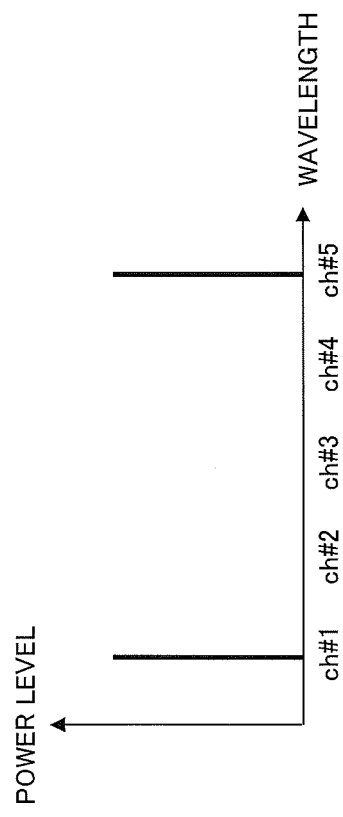
FIG. 9 is a diagram illustrating an example of a power level of output signal light in the wavelength selective switch.

However, when the 0CM 444 detects the power level of the signal light of each channel as illustrated in FIG. 9, it is found that the signal light of the ch#3 to be output is not output.

Thus, the OCM 444 can detect that some operation abnormality occurs in at least the WSS 404.

Figure 10:
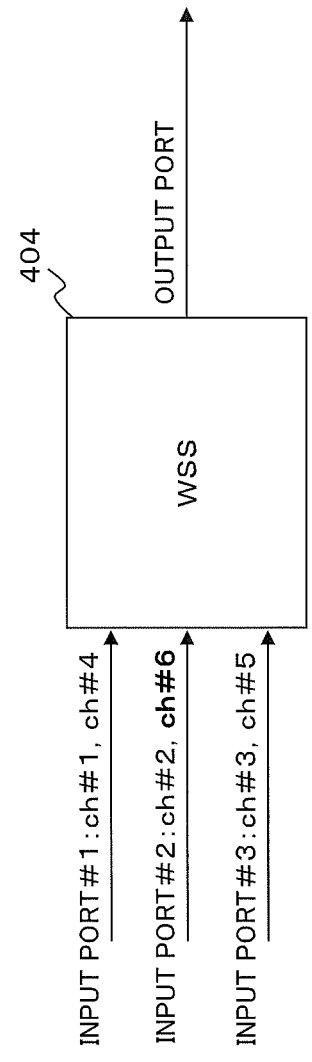
FIG. 10 is a diagram illustrating an example of input and output in the wavelength selective switch.

Further, as illustrated in FIG. 10, a case is considered in which the ch#6 is added, wavelength-division multiplexed light obtained by the wavelength-division multiplexing of each signal light of the ch#1 and ch#4 is input from the input port #1, wavelength-division multiplexed light obtained by the wavelength-division multiplexing of each signal light of the ch#2 and ch#6 is input from the input port #2, and wavelength-division multiplexed light obtained by the wavelength-division multiplexing of each signal light of the ch#3 and ch#5 is input from the input port #3.

In this case, when the WSS 404 is provided with input and output setting as illustrated in FIG. 11, wavelength-division multiplexed light obtained by the wavelength-division multiplexing of each signal light of the ch#1, ch#3, ch#5, and ch#6 is to be output from the WSS 404.

Figure 12:
FIG. 12 is a diagram illustrating an example of a power level of the output signal light in the wavelength selective switch.

However, when the OCM 444 detects the power level of the signal light of each channel as illustrated in FIG. 12, it is found that each signal light of the ch#3 and ch#6 to be output is not output.

Thus, even in such a case where the channel is added, the OCM 444 can detect that some operation abnormality occurs in at least the WSS 404.

As a cause of the operation abnormality in the WSS 404, for example, deterioration or arrangement deviation of the mirror array 435 inside the WSS 404 or an optical element such as the dispersion element 433, deviation of an refractive index due to a change in composition of a filling gas, deterioration of a driving circuit, failure thereof or the like is considered.

In this case, the signal light input to the WSS 404 may be unavailable to be output normally, for example, the signal light is not output from the WSS 404, or a transmission band of the WSS 404 is deteriorated.

Specifically, under the circumstances where a signal rate per one wavelength becomes a high speed such as 10 G, 40 G, 100 G, . . . , a signal light spectrum tends to be thicker in a wavelength direction, and thus the deterioration in the transmission band of the WSS 404 more easily causes degradation in signal quality.

However, as described with reference to FIGS. 6 to 12, in a method of monitoring input and output power levels of a main signal, it is unavailable to monitor the deterioration in the transmission band of the WSS 404. Further, since communication of main signal light is needed at the time of the monitor control of the WSS 404, the monitor control of the WSS 404 is not available when the main signal light is not present like before the optical transmission network is in service. For example, in the example illustrated in FIGS. 10 to 12, since the operation abnormality of the WSS 404 is detected after the ch#6 is added, the degradation in service quality may occur.

Furthermore, although a monitor light may be input to the wavelength selective switch together with the main signal light, the interference with the main signal light may occur, the interference with the main signal light by the monitor light may occur in this case.

Further, even in the variable dispersion compensator capable of performing variable dispersion compensation processing on the input light, there is a problem similar to the above.

Therefore, this example proposes a monitor control method to be described below.

(2) With respect to Embodiment

Figure 13:
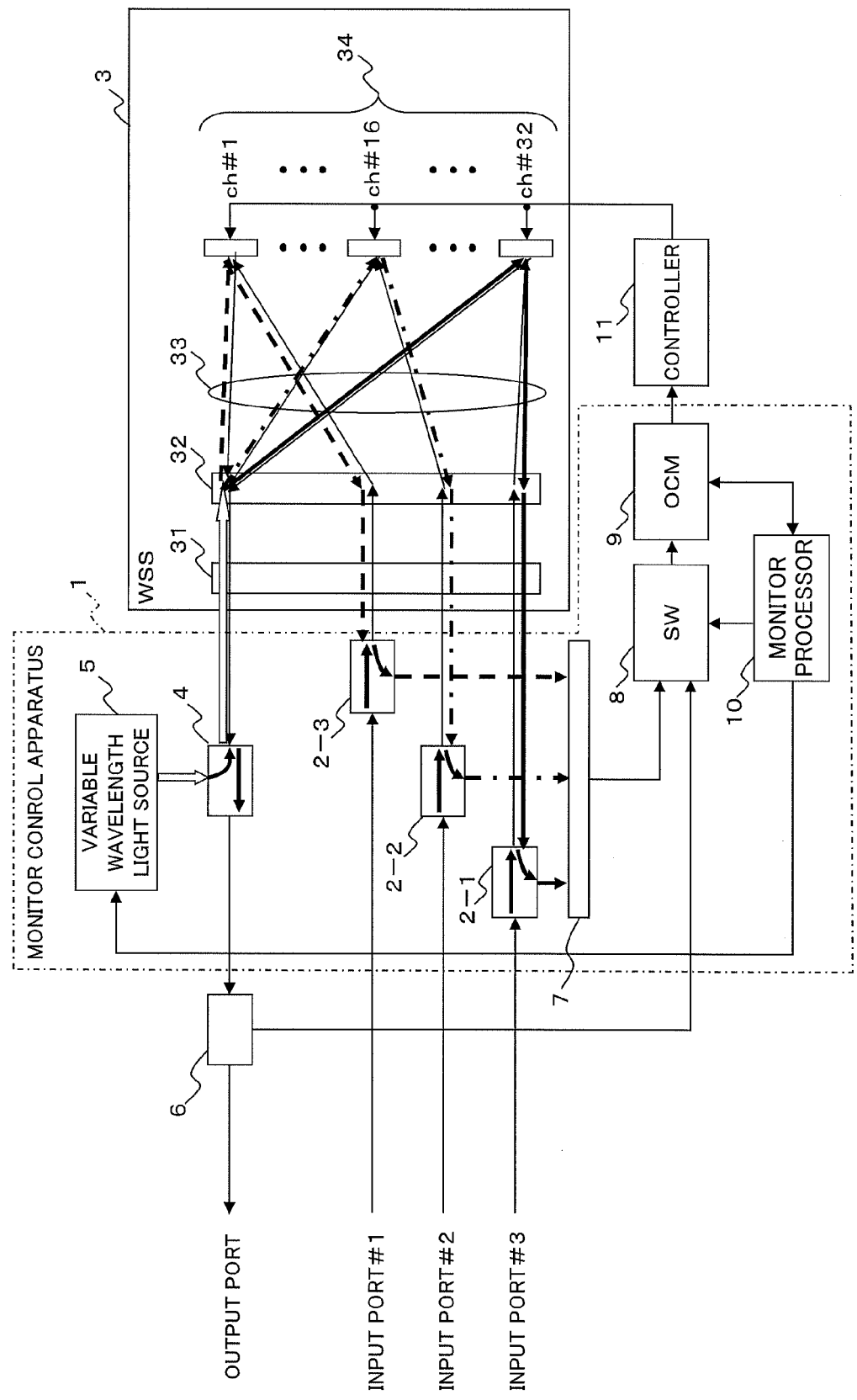
FIG. 13 is a diagram illustrating an example of a monitor control method according to an embodiment.

A monitor control system of a wavelength selective switch according to an embodiment is illustrated in FIG. 13. In FIG. 13, the monitor control system for a WSS 3 with three-input and one-output is illustrated for example but the number of input ports and the number of output ports are not limited to this combination.

Further, FIG. 13 illustrates an example in which wavelength-division multiplexed light input to each input port includes each signal light of ch#1 to ch#32 but the number of multiplexed wavelengths (the number of channels) is not also intended to be limited thereto.

The monitor control system illustrated in FIG. 13 includes, for example, optical circulators 2-1 to 2-3, the wavelength selective switch (WSS) 3, an optical circulator 4, a variable wavelength light source 5, optical couplers 6 and 7, an optical switch (SW) 8, an optical channel monitor (OCM) 9, a monitor processor 10, and a controller 11. Further, a monitor control apparatus 1 may be configured by the optical circulators 2-1 to 2-3 and 4, the variable wavelength light source 5, the optical coupler 7, the SW 8, the OCM 9, and the monitor processor 10 to monitor the transmission band of the WSS 3. Alternatively, the WSS 3 may be configured as a wavelength selective switch with a monitor control function by integrally being formed with the monitor control apparatus 1. Further, the monitor control apparatus 1 or the wavelength selective switch with the monitor control function may be disposed in at least any one of a plurality of optical transmission apparatuses which constitute an optical transmission system.

For example, the WSS 3 selectively outputs signal light with each wavelength included in each wavelength-division multiplexed light input from input ports #1 to #3 to an output port.

For this, the WSS 3 includes a collimator 31 which collimates input light, a dispersion element 32 which demultiplexes light from the collimator 31 for each wavelength, a lens 33 which collects incident light from the dispersion element 32, and a mirror array 34 which reflects the incident light from the lens 33 at a target angle.

In other words, the WSS 3 serves as an example of a wavelength selective switch configured to demultiplex wavelength-division multiplexed light input from an input side for each wavelength, to supply the demultiplexed signal light beams each having demultiplexed wavelength to deflectors corresponding to the demultiplexed wavelength, and to control the amount of deflection of each of the deflectors to selectively output the demultiplexed signal light each having the demultiplexed wavelength from an output side.

Here, in the monitor control system illustrated in FIG. 13, the wavelength-division multiplexed signal light beams input from the input ports #1 to #3 are input to the WSS 3 through the optical circulators 2-1 to 2-3, respectively.

Each of the wavelength-division multiplexed signal light beams input to the WSS 3 is demultiplexed for each wavelength by the WSS 3, the signal light each having the wavelength is selected, and the selected signal light is again multiplexed to be output to the route of the output port.

The wavelength-multiplexed signal light output from the WSS 3 passes through the optical circulator 4 to be output from the output port. In the example illustrated in FIG. 13, the wavelength-multiplexed signal light output from the WSS 3 is split in power to a route of the SW 8 by the optical coupler 6 after passing through the optical circulator 4.

Further, in the embodiment, the variable wavelength light source 5 is provided at the output port side of the WSS 3 to generate and output monitor light used for monitoring the transmission band of the WSS 3.

The monitor light (refer to the white arrow in FIG. 13) output from the variable wavelength light source 5 is incident on the WSS 3 from the output side (output side of wavelength-division multiplexed signal light) of the WSS 3 through the optical circulator 4. The monitor light incident on the WSS 3 is incident on an MEMS mirror depending on the wavelength by the dispersion element 32 and the lens 33 in the WSS 3, is reflected to the MEMS mirror, is propagated in a direction opposite to a propagation direction of the signal light, and is output from the input side (input side of wavelength-division multiplexed signal light) of the WSS 3.

In other words, the optical circulator 4 serves as an example of a monitor light input unit configured to input the monitor light generated by the variable wavelength light source 5 from the output side of the WSS 3.

Figure 14:
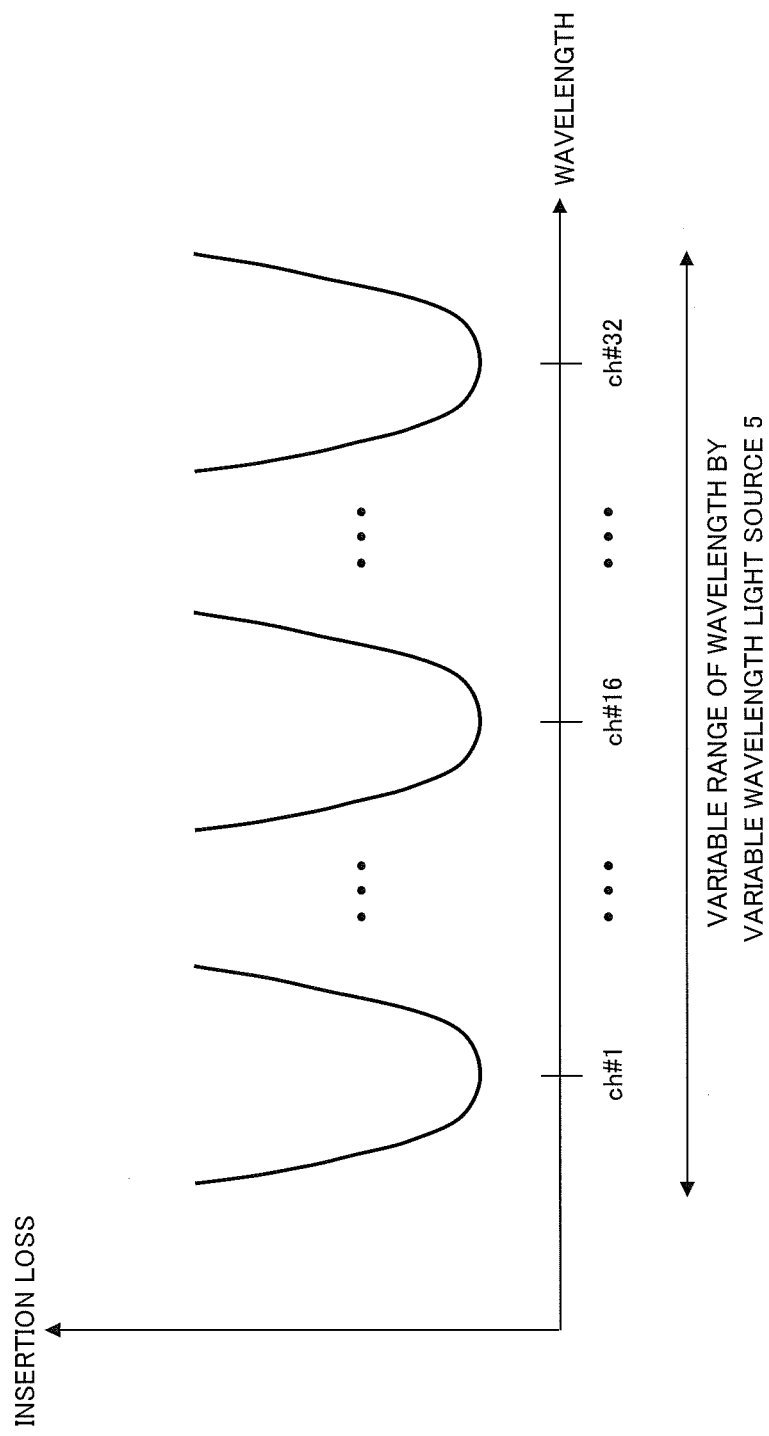
FIG. 14 is a diagram illustrating an example a wavelength range of monitor light.

Here, as illustrated in FIG. 14, in order to monitor the transmission band (insertion loss characteristics) of the WSS 3 by using the monitor light, the monitor processor 10 changes an output wavelength of the variable wavelength light source 5 such that the monitor light covers the wavelength band (for example, ch#1 to ch#32) included in the wavelength-division multiplexed signal light (performs sweep control).

Therefore, the monitor processor 10 may be configured to include a processor and a memory. The processor is a device for processing data and includes, for example, a central processing unit (CPU), a digital signal processor (DSP), a large scale integration (LSI), and a field-programmable gate array (FPGA). In addition, the memory is a device for storing data and includes, for example, a read only memory (ROM), a random access memory (RAM), and a magnetic storage device.

Figure 15:
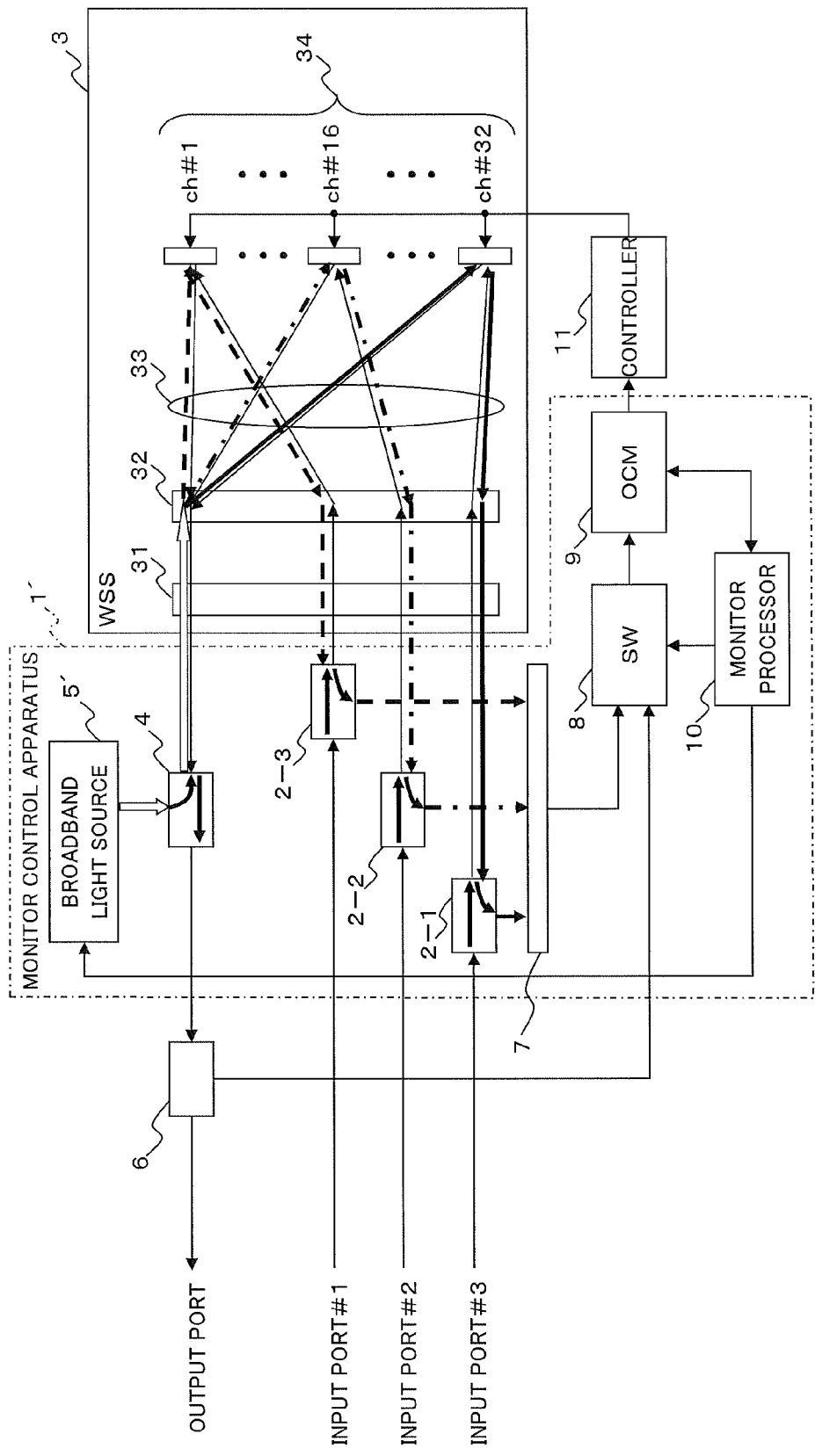
FIG. 15 is a diagram illustrating another example of the monitor control method according to the embodiment.

Alternatively, as illustrated in FIG. 15, a monitor control apparatus 1' having a broadband light source 5' may be used to output broadband light with wavelength bands covering the wavelength included in the wavelength-division multi-plexed signal light in place of the monitor control apparatus 1 having the variable wavelength light source 5. For example, amplified spontaneous emission (ASE) light may be used as the broadband light. As the ASE light, for example, light obtained by splitting the output of the optical amplifier 401 may be used. In the case where the broadband light source 5' is utilized, the sweep control in the monitor processor 10 is allowed to skip.

Returning to FIG. 13 again, when the wavelength of the monitor light output from the variable wavelength light source 5 coincides with the wavelength set in the WSS 3, the monitor light is output from the optical circulators 2-1 to 2-3. In FIG. 13, as an example, the monitor light corresponding to the ch#1 is indicated by a thick dotted-line, the monitor light corresponding to the ch#16 is indicated by a thick solid-line, and the monitor light corresponding to the ch#32 is indicated by a thick dashed-line.

For example, the optical circulators 2-1 to 2-3 serve as an example of a monitor light extraction unit configured to extract the monitor light input from the output side of the WSS 3 by the optical circulator 4, the monitor light being propagated in the direction opposite to the propagation direction of the signal lights each having the wavelength in the WSS 3 and being output from the input side of the WSS 3.

Then, the monitor light output from the input side (input side of the wavelength-division multiplexed signal light) of the WSS 3 is guided to a route of the optical coupler 7 by the optical circulators 2-1 to 2-3 to be multiplexed by the optical coupler 7 and then is input to the SW 8.

In this way, since the WSS 3 has a structure in which an optical system is symmetrical to connect each of the input ports with the output port, it is possible to extract the monitor light input from the direction opposite to that of the wavelength-division multiplexed signal light and is reflected by the mirror array 34, by the optical circulators 2-1 to 2-3 arranged at the input side of the wavelength-division multiplexed signal light.

The SW 8 selectively outputs the input light to the OCM 9, and the OCM 9 monitors the light input from the SW 8.

In other words, the OCM 9 serves as an example of a monitor configured to monitor the monitor light extracted by the optical circulators 2-1 to 2-3.

When signal light having the same wavelength is input from a plurality of input ports, the WSS 3 is originally unavailable to simultaneously output the signal light. For example, when the signal light of the ch#1 is input to the input port #1, each MEMS mirror is coupled to the output port such that each of the signal light of the ch#1 input from other input ports #2 and #3 is not output from the output port. Accordingly, since the signal light having the same wavelength is not simultaneously output from the optical circulators 2-1 to 2-3, each output light from the optical circulators 2-1 to 2-3 can be multiplexed by the optical coupler 7 and then can be monitored by the OCM 9.

The SW 8 switches the output depending on timing of monitoring the signal light output from the WSS 3 and timing of monitoring the monitor light (in other words, transmission band of WSS 3) output from the WSS 3.

The OCM 9 monitors, for example, transmission band characteristics of the WSS 3 based on a comparison result between the power level of the monitor light generated by the variable wavelength light source 5 and the power level of the monitor light output from the WSS 3. The monitor result is notified to the monitor processor 10.

Thereby, as illustrated in FIG. 14, the monitor processor 10 can monitor a state of insertion loss characteristics (transmission band) of the WSS3.

Specifically, for example, the monitor processor 10 holds information (wavelength to power level, etc.) on the transmission band characteristics of the WSS 3 in a state (initial state) where the transmission band is not deteriorated in the memory to compare a monitor result on the transmission band of the WSS 3 notified from the OCM 9 with the information on the transmission band characteristics of the WSS in the initial state.

Then, for example, when a transmission bandwidth of the WSS 3 is deteriorated by a predetermined threshold value (for example, about 20% or more) or more compared to the initial state, the monitor processor 10 may determine that the transmission band of the WSS 3 is deteriorated and generate and output an alarm signal for informing a network administrator or the like that the transmission band of the WSS 3 is deteriorated.

Further, with respect to the threshold value when the monitor processor 10 determines that the transmission band of the WSS 3 is deteriorated, it may be appropriately determined depending on, for example, a modulation scheme, a signal rate, the number of transmission spans and the like. Specifically, for example, the threshold value may be determined based on an allowable penalty value determined by a transmission simulation or the like.

Figure 16:
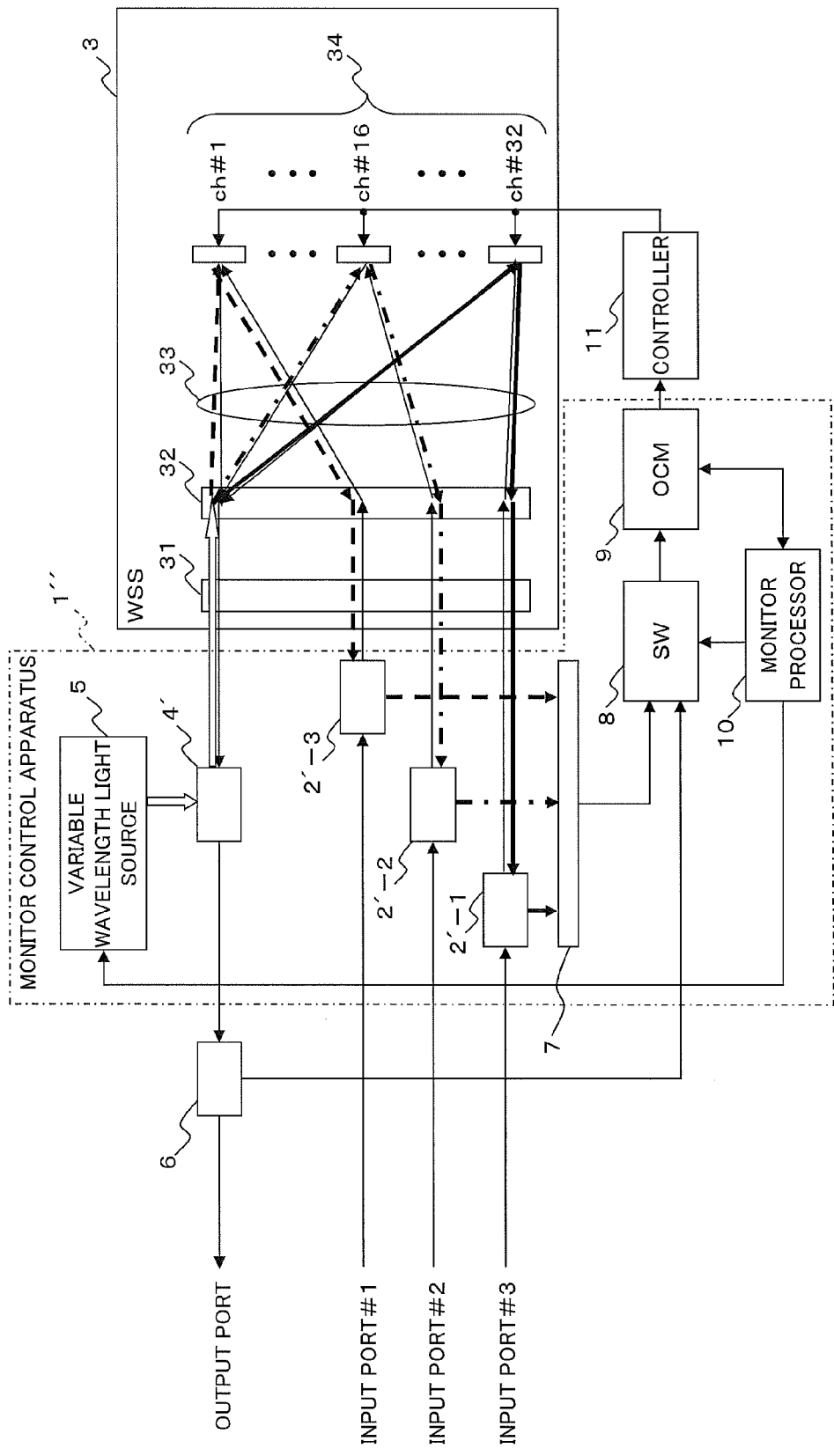
FIG. 16 is a diagram illustrating another example of the monitor control method according to the embodiment.

In addition, as illustrated in FIG. 16, a monitor control apparatus 1" having optical couplers 2'-1 to 2'-3 and 4' may be used in place of the monitor control apparatus 1 having the optical circulators 2-1 to 2-3 and 4. When the WSS 3 is optically asymmetric or is isolated by components other than the optical circulators 2-1 to 2-3 and 4, the optical couplers 2'-1 to 2'-3 and 4' cheaper than the optical circulators 2-1 to 2-3 and 4 can be used, and thus it is possible to reduce manufacturing costs of the monitor control apparatus 1" in this case. Further, the optical circulators 2-1 to 2-3 and 4 and the optical couplers 2'-1 to 2'-3 and 4' may be used in combination with each other.

Here, an example of the monitor control method will be described with reference to FIG. 17.

Figure 17:
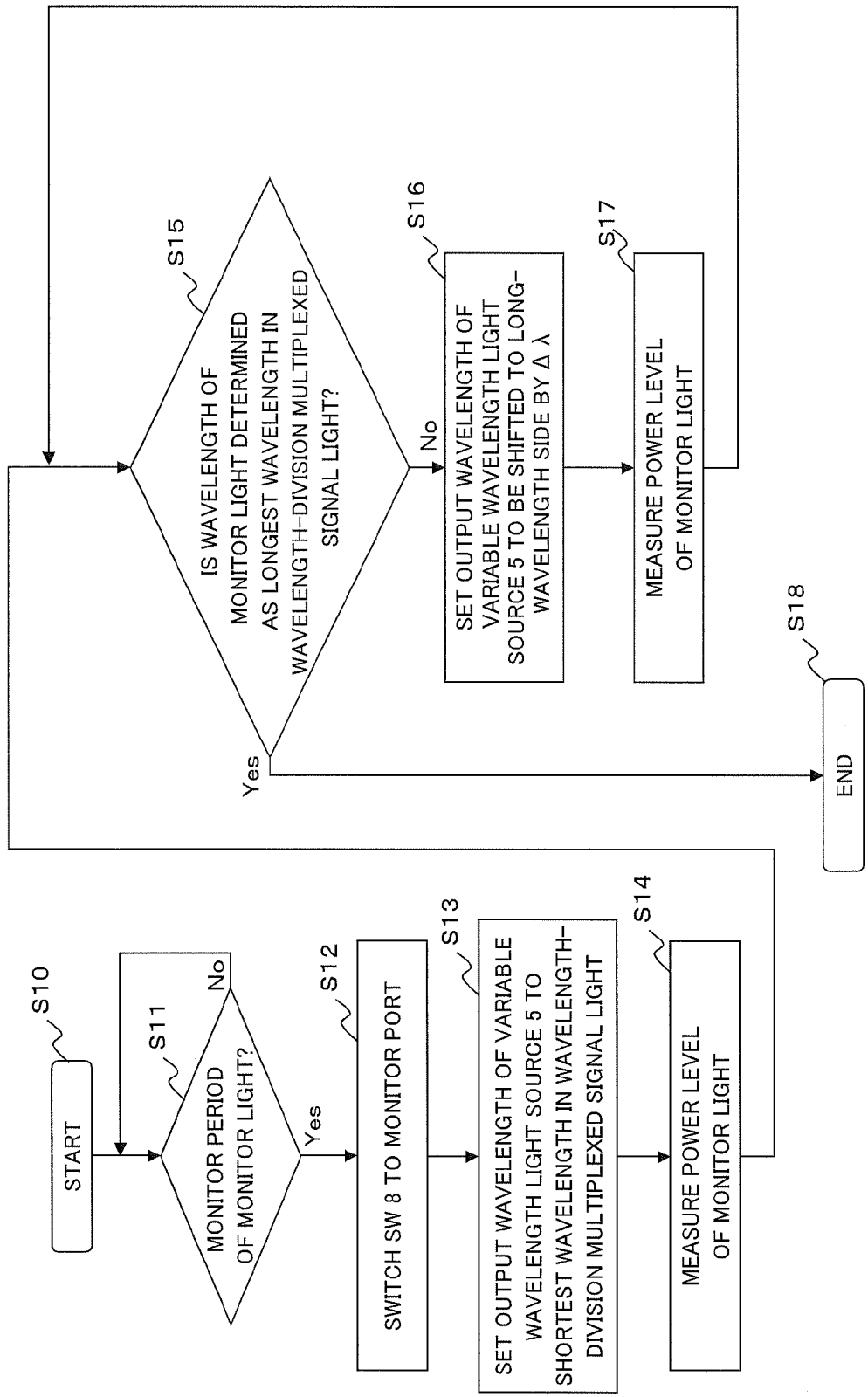
FIG. 17 is a flowchart illustrating an example of the monitor control method.

As illustrated in FIG. 17, for example, when a monitor control processing is started (step S10) in unscheduled timing such as during increase or decrease of the number of channels or during the change in the configuration of the optical transmission system or in scheduled timing such as s predetermined monitor period, the monitor control apparatus 1 determines whether the present time is within a monitor period of the monitor light (step S11).

Upon determining that the present time is not within the monitor period of the monitor light (No route in step S11), the monitor control apparatus 1 waits as it is and repeats determination processing of step S11.

On the other hand, upon determining that the present time is within the monitor period of the monitor light (Yes route in step S11), the monitor control apparatus 1 switches output setting of the SW 8 to a monitor port side and controls the SW 8 such that the SW 8 can output the monitor light output from the WSS 3 and input from the optical coupler 7 to the OCM 9 (step S12).

In addition, the monitor control apparatus 1 sets the output wavelength of the variable wavelength light source 5 to the shortest wavelength of the wavelength band in the signal light included in the wavelength-division multiplexed signal light (step S13). Alternatively, the monitor control apparatus 1 may set the output wavelength of the variable wavelength light source 5 to the longest wavelength of the wavelength band in the signal light included in the wavelength-division multiplexed signal light.

Then, the monitor control apparatus 1 measures the power level of the monitor light output from the input side of the main signal light in the WSS 3 by using the OCM 9 (step S14).

Next, the monitor control apparatus 1 determines whether the wavelength of the monitor light is the longest wavelength of the wavelength band (step S15). In step S13, upon setting the output wavelength of the variable wavelength light source 5 to the longest wavelength of the wavelength band in the signal light included in the wavelength-division multiplexed signal light, the monitor control apparatus 1 determines whether the wavelength of the monitor light is the shortest wavelength of the wavelength band.

Here, upon determining that the wavelength of the monitor light is the longest wavelength of the wavelength band (Yes route in step S15), the monitor control apparatus 1 ends the monitor control processing (step S18).

On the other hand, upon determining that the wavelength of the monitor light is not the longest wavelength of the wavelength band (No route in step S15), the monitor control apparatus 1 controls the output wavelength of the variable wavelength light source 5 to be shifted to the long-wavelength side by $\Delta\lambda(>0)$ (step S16). In step S13, upon setting the output wavelength of the variable wavelength light source 5 to the longest wavelength of the wavelength band in the signal light included in the wavelength-division multiplexed signal light, the monitor control apparatus 1 controls the output wavelength of the variable wavelength light source 5 to be shifted to the short-wavelength side by $\Delta\lambda$. Here, preferably, $\Delta\lambda$ is a value (for example, 0.05 nm) smaller than a channel spacing of the main signal light.

Then, the monitor control apparatus 1 measures the power level of the monitor light which is output from the input side of the main signal light in the WSS 3 and is subjected to the change in wavelength, by using the OCM 9 (step S17) and performs again the processing of step S15.

Thereby, the monitor control apparatus 1 can monitor the power level of the monitor light output from the WSS 3 while changing the wavelength of the monitor light to monitor the transmission band with respect to the wavelength-division multiplexed signal light in the WSS 3.

Figure 18:
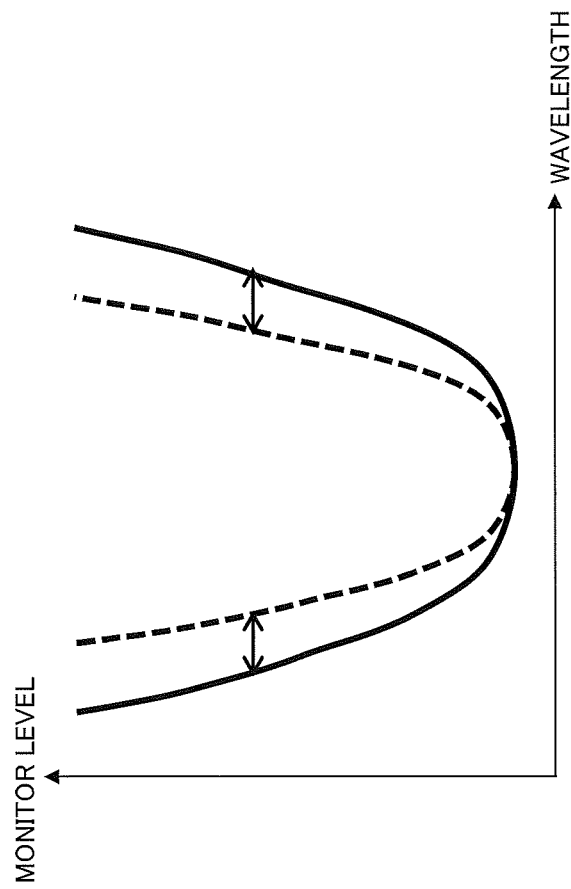
FIG. 18 is a diagram illustrating an example of deterioration of a transmission band.
Figure 19:
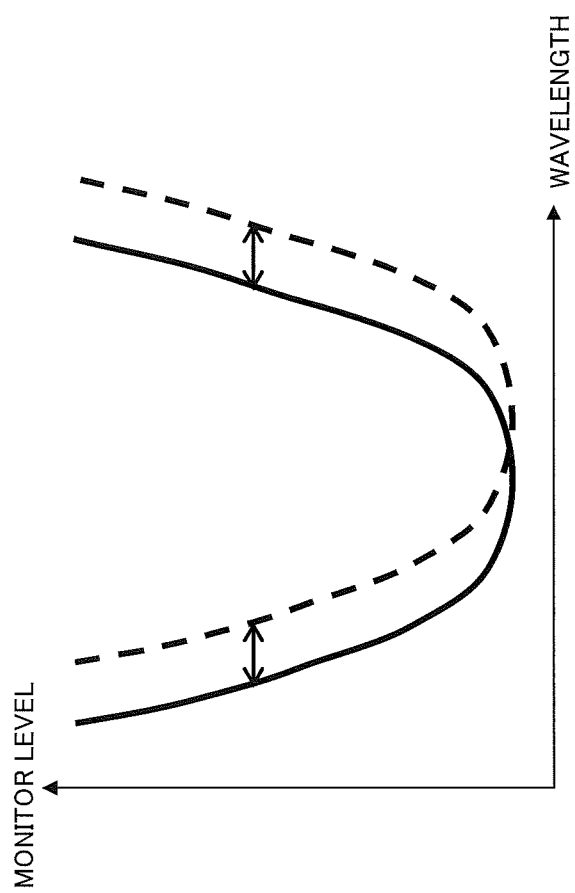
FIG. 19 is a diagram illustrating an example of the deterioration of the transmission band.

Specifically, for example, as illustrated by the thick solid-line in FIGS. 18 and 19, the monitor control apparatus 1 holds information (wavelength to power level, etc.) on the transmission band characteristics of the WSS 3 in a state (initial state) where the transmission band is not deteriorated in the memory to compare a monitor result (see the thick dotted-line in FIGS. 18 and 19) on the transmission band of the WSS 3 notified from the OCM 9 with the information on the transmission band characteristics of the WSS in the initial state.

Then, for example, as the monitor result, when the transmission band becomes narrow by a predetermined threshold value or more compared to the transmission band of the WSS in the initial state as illustrated in FIG. 18 or deviates by the predetermined threshold value or more compared to the transmission band of the WSS in the initial state as illustrated in FIG. 19, the monitor control apparatus 1 may determine that the transmission band of the WSS 3 is deteriorated to generate and output an alarm signal for informing a network administrator or the like that the transmission band of the WSS 3 is deteriorated.

With respect to the threshold value, it may be appropriately determined depending on, for example, a signal rate or the number of transmission spans. Specifically, for example, the threshold value may be determined based on an allowable penalty value determined by a transmission simulation or the like.

Figure 20:
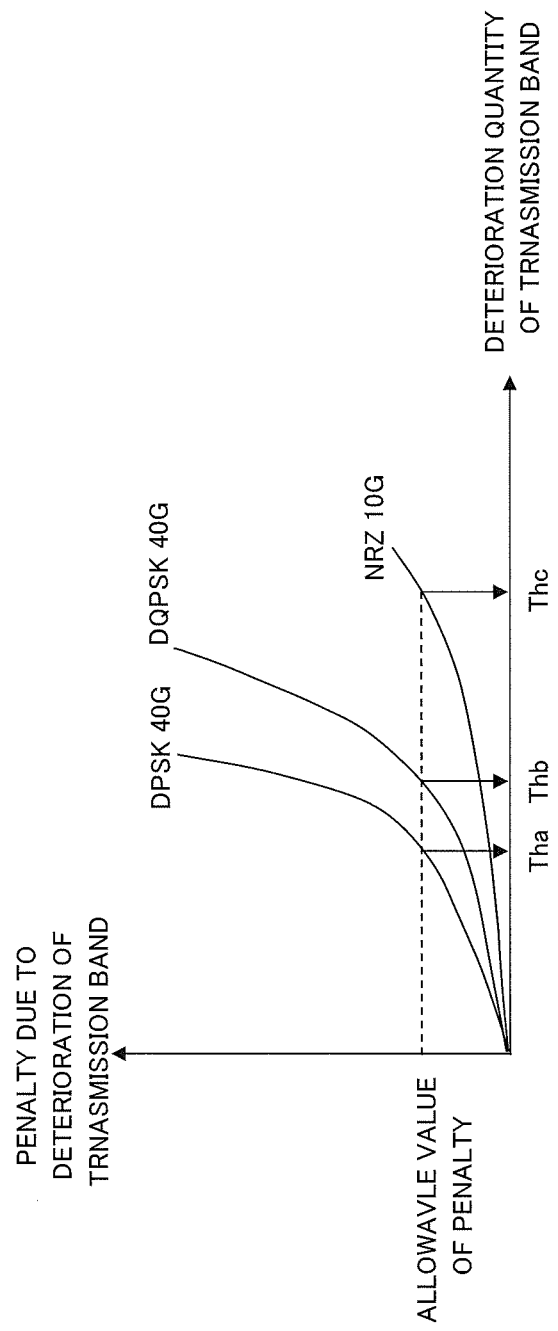
FIG. 20 is a diagram illustrating an example of an allowable value of a penalty depending on rate of signal light.

In an example illustrated in FIG. 20, with respect to 40 Gbps main signal light modulated by using a differential phase shift keying (DPSK), 40 Gbps main signal light modulated by using a differential quadrature phase shift keying (DQPSK), and 10 Gbps main signal light modulated by using a non-return-to-zero (NRZ) scheme, respectively, the relation between the deterioration quantity of transmission band and the penalty is measured by the transmission simulation to calculate threshold values Tha, Thb, and Thc for a predetermined allowable value of the penalty.

As described above, according to the embodiment, it is possible to effectively monitor the transmission band of the wavelength selective switch.

Further, even in a state where the signal light is communicated, it is possible to monitor the deterioration status of the transmission band of the wavelength selective switch without affecting the signal light.

Furthermore, since the transmission band of the wavelength selective switch can be monitored even without the signal light, it is possible to confirm whether the transmission band corresponding to new signal light to be added is normal even before the new signal light is added.

(3) Others

Further, each component and each function of the monitor control apparatus 1 and the wavelength selective switch 3 according to the above-described embodiment may be selected if necessary and may be used in an appropriate combination. In other words, each component and each function may be selected or be used in the appropriate combination to realize functions of the present invention.

For example, the monitor control method according to the embodiment may be applied to a bi-directional optical apparatus without being limited to the application to the wavelength selective switch 3 described above.

Figure 21:
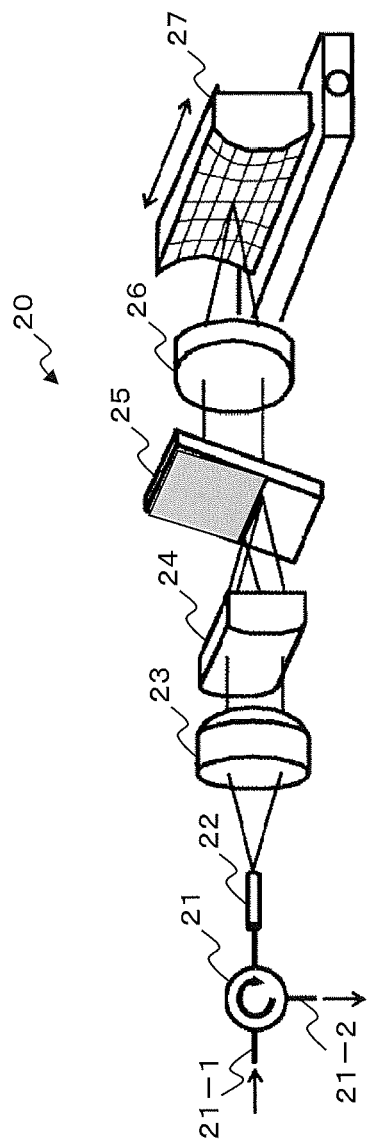
FIG. 21 is a diagram illustrating an example of a configuration of an optical device to which the embodiment is applicable.

Specifically, for example, the present invention is also applicable to a virtually imaged phased array (VIPA) wavelength dispersion compensator 20 as illustrated in FIG. 21. The VIPA wavelength dispersion compensator 20 includes, for example, an optical circulator 21, an optical fiber 22, a collimator lens 23, a cylindrical lens 24, a VIPA plate 25, a collecting lens 26, and a three-dimensional mirror 27. For example, the VIPA plate 25 may be configured as an etalon in which a semi-transmission film is formed on one surface of a glass plate and a reflective film is formed on the other surface of the glass plate.

In the VIPA wavelength dispersion compensator 20, for example, the light emitted from one end of the optical fiber 22 through the optical circulator 21 is converted into the parallel light by the collimator lens 23 and is collected on the line by the cylindrical lens 24 to enter between parallel planes opposite to each other through an irradiation window of the VIPA plate 25. For example, incident light to the VIPA plate 25 is repeatedly multi-reflected between a reflection film formed on one plane of the VIPA plate 25 to slightly transmit the light and a reflection film formed on the other plane to have a reflection ratio of about 100%. At this time, the light beams transmitted through the reflection film interfere with each other to form a plurality of light fluxes dispersed in one direction at different angles depending on the wavelengths and are collected on the three-dimensional mirror 27 through the collecting lens 26.

In the VIPA wavelength dispersion compensator 20, it is possible to vary the optical distance for each wavelength and to change the dispersion by making the three-dimensional mirror 27 to move. In other words, the VIPA wavelength dispersion compensator 20 has a function to output the light from the output port 21-2 by performing the variable dispersion compensation processing on the light input from the input port 21-1.

For example, the VIPA wavelength dispersion compensator 20 serves as an example of the variable dispersion compensator including: an optical system configured to collect input light input from an input side in a one-dimensional direction; an optical component having two parallel planes opposite to each other, one of the parallel planes being formed with an irradiation window and a first reflection surface, the other of the parallel planes being formed with a second reflection surface, the light collected in the one-dimensional direction by the optical system entering between the first reflection surface and the second reflection surface through the irradiation window, the entered light being multi-reflected on each of the reflection surfaces and a part of the reflected light being transmitted and emitted through the second reflection surface, the parallel planes serving as a wavelength demultiplexer configured to form light fluxes traveling in different directions depending on wavelengths by using interference of the emitted light from the second reflection surface; and a reflector configured to reflect the light fluxes each having the demultiplexed wavelength, the light fluxes being emitted to different directions from the second reflection surface of the optical component, such that the light fluxes return to the optical component and are output from the output side.

For example, any one of the monitor control apparatuses 1, 1', and 1" is arranged at an input port 21-1 side and an output port 21-2 side of the VIPA wavelength dispersion compensator 20, the monitor light is input from the output port 21-2, and the input monitor light reciprocates through the optical circulator 21, the optical fiber 22, the collimator lens 23, the cylindrical lens 24, the VIPA plate 25, the collecting lens 26, and the three-dimensional mirror 27 to be output from the input port 21-1. Thereby, it is possible to monitor whether the transmission band of the VIPA wavelength dispersion compensator 20 is normal by measuring the output monitor light.

Further, the VIPA wavelength dispersion compensator 20 may be integrally configured with any one of the monitor control apparatuses 1, 1', and 1" to be configured as a variable dispersion compensator with the monitor control function, and any one of the monitor control apparatuses 1, 1', and 1" or the variable dispersion compensator having the monitor control function may be arranged in at least any one of plural optical transmission apparatuses that constitutes the optical transmission system.

As described above, the present invention is widely applicable to the bi-directional optical device.

In addition, since it is considered that there is little possibility that the deterioration in the transmission band of the WSS 3 rapidly occurs, the monitor of the main signal light and the monitor of the monitor light are performed by the same OCM 9 in the above-described embodiment. However, when the switching of the wavelength frequently occurs in the future, the monitor may be performed by the OCM 9 faster than the switching or an OCM for monitoring the main signal light and an OCM for monitoring the monitor light may be separately arranged.

Further, the monitor control method according to the embodiment is applicable to a general WDM network, and a Point-to-point network, a mesh-type network or the like without being limited to a ring network is applicable to a network topology of the WDM network. In other words, the embodiment may be applicable not only to the optical transmission apparatus as an optical add-drop multiplexer (OADM) but also to a terminal apparatus or a relay node without add-drop function.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A wavelength selective switch configured to demultiplex wavelength-division multiplexed light input from an input port for each wavelength, to supply the demultiplexed signal lights each having demultiplexed wavelength to deflectors corresponding to the demultiplexed wavelength, and to control the amount of deflection of each of the deflectors to selectively output the demultiplexed signal lights each having the demultiplexed wavelength to an output port, the wavelength selective switch comprising:

a light source configured to generate monitor light having at least a wavelength included in the wavelength-division multiplexed light;

a monitor light input unit configured to insert the monitor light generated by the light source to an optical path coupled to the output port in the wavelength selective switch;

a monitor light extraction unit configured to extract the monitor light inserted to the optical path in the wavelength selective switch by the monitor light input unit, the monitor light being propagated in a direction opposite to a propagation direction of the signal lights each having the demultiplexed wavelength in the wavelength selective switch and being output to the input port of the wavelength selective switch; and a monitor configured to monitor the monitor light extracted by the monitor light extraction unit, wherein the monitor monitors transmission band characteristics of the wavelength selective switch based on a comparison result between a power level of the monitor light generated by the light source and a power level of the monitor light extracted by the monitor light extraction unit.

2. The wavelength selective switch according to claim 1, wherein the light source is a variable wavelength light source configured to output light having a plurality of wavelengths.

3. The wavelength selective switch according to claim 1, wherein the light source is a broadband light source configured to output broadband light.

4. An optical transmission apparatus comprising the wavelength selective switch according to claim 1.

5. An optical transmission system comprising the optical transmission apparatus according to claim 4.

* * * * *